United States Patent [19]

Harasaki et al.

[11] Patent Number: 4,552,400
[45] Date of Patent: Nov. 12, 1985

[54] TWO-DOOR TYPE AUTOMOBILE BODY STRUCTURE

[75] Inventors: Hayathugu Harasaki; Osamu Matsuura, both of Hiroshima, Japan

[73] Assignee: Mazda Motor Company, Hiroshima, Japan

[21] Appl. No.: 693,315

[22] Filed: Jan. 22, 1985

Related U.S. Application Data

[63] Continuation of Ser. No. 404,838, Aug. 3, 1982, abandoned.

[30] Foreign Application Priority Data

Aug. 4, 1981 [JP] Japan .................. 56-122209
Aug. 7, 1981 [JP] Japan .................. 56-123815

[51] Int. Cl.⁴ .................. B62D 25/00; B62D 23/00
[52] U.S. Cl. .................. 296/185; 296/193; 296/203; 296/209
[58] Field of Search .................. 296/29, 185, 187, 188, 296/191, 193-195, 198, 202-204, 209

[56] References Cited

U.S. PATENT DOCUMENTS

| | | | |
|---|---|---|---|
| 1,844,966 | 2/1932 | Ledwinka | 296/202 |
| 2,248,319 | 7/1941 | Waterhouse, Jr. | 296/202 |
| 2,306,416 | 12/1942 | Waterhouse, Jr. | 296/188 |
| 2,383,428 | 8/1945 | Ulrich | 296/202 |
| 3,423,123 | 1/1969 | Wessells, III | 296/185 |
| 4,234,225 | 11/1980 | Harasaki | 296/195 |
| 4,294,487 | 10/1981 | Nakamura | 296/195 |

FOREIGN PATENT DOCUMENTS

| | | | |
|---|---|---|---|
| 2421189 | 6/1975 | Fed. Rep. of Germany | 296/195 |
| 2843668 | 4/1980 | Fed. Rep. of Germany | 296/185 |
| 5477318 | 11/1975 | Japan . | |
| 65534 | 11/1942 | Norway | 296/202 |

Primary Examiner—Robert B. Reeves
Assistant Examiner—Dennis H. Pedder
Attorney, Agent, or Firm—Fleit, Jacobson, Cohn & Price

[57] ABSTRACT

A body structure for a two-door type automobile including a roof rail extending along each side of a roof panel, a side sill extending along each side of a floor panel, a center pillar having an upper end connected with the roof rail and extending substantially downwardly therefrom, a rear fender panel having a substantially vertically extending front edge portion which is bent transversely inwardly of the body structure to form a stepped configuration complementary to a rear edge configuration of a side door adapted to be mounted on said body structure, an inner panel having a front edge secured to the front edge portion of the rear fender panel and a rear edge also secured to the rear fender panel to form a lower pillar of closed cross-section, the lower pillar being connected at an upper end with the center pillar and at a lower end with the side sill.

6 Claims, 8 Drawing Figures

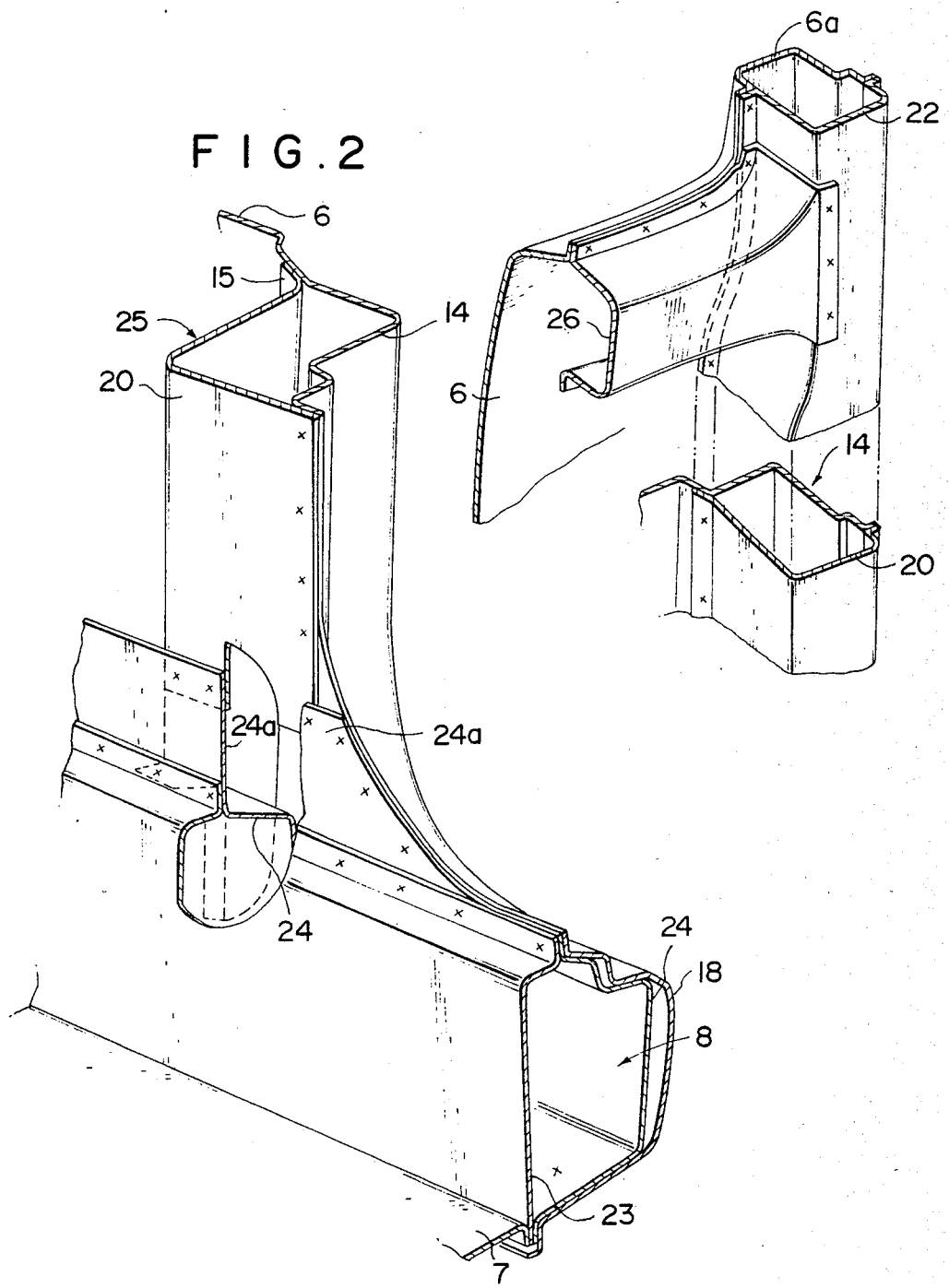

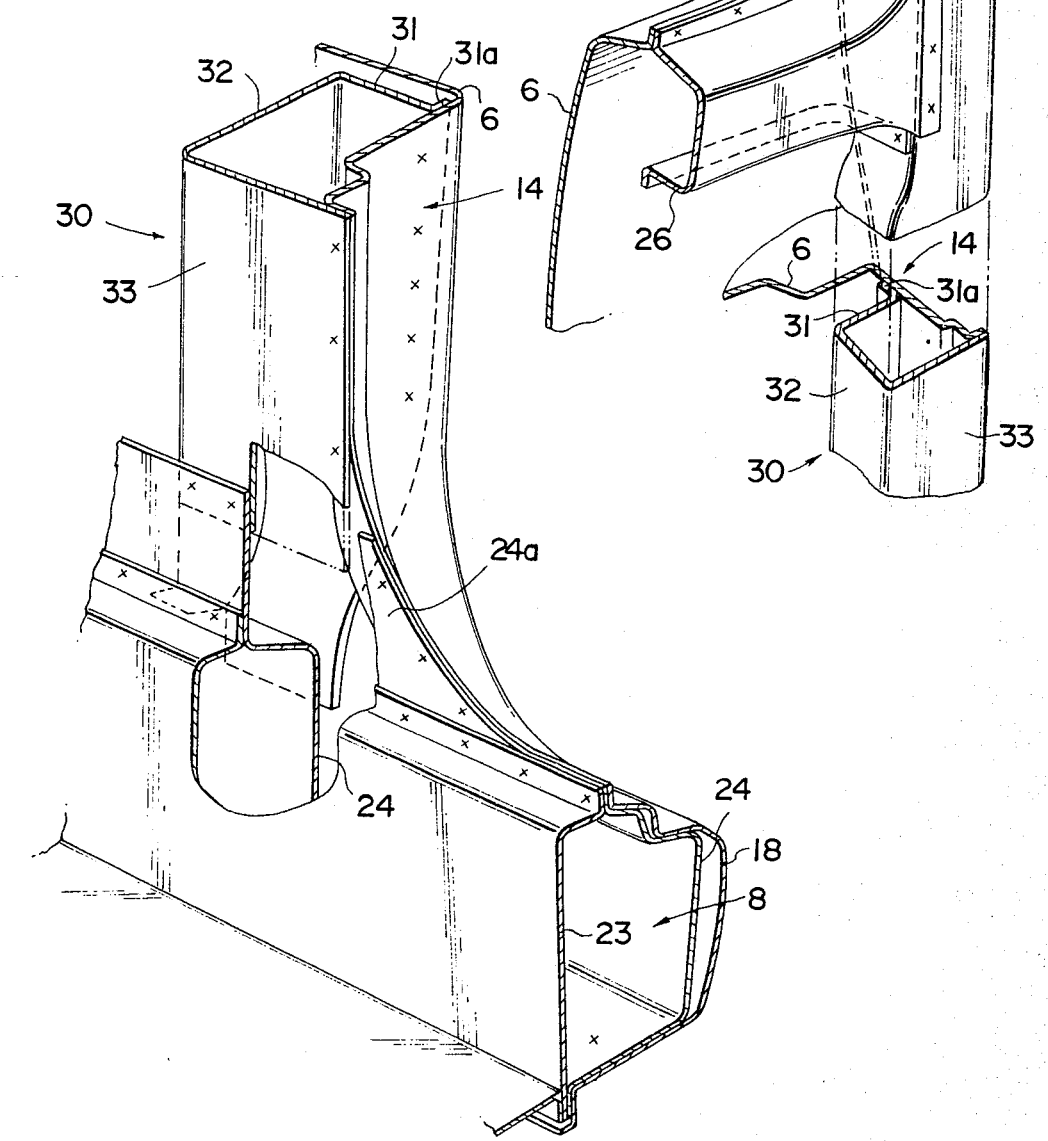
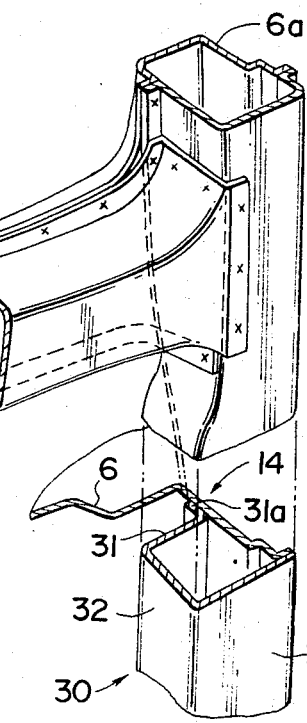
FIG. 4
FIG. 5

TWO-DOOR TYPE AUTOMOBILE BODY STRUCTURE

This application is a continuation of application Ser. No. 404,838, filed Aug. 3, 1982, abandoned.

The present invention relates to an automobile body structure, and more particularly to a so-called two-door type automobile body structure having two side doors, one on each side of the body. More specifically, the present invention pertains to a rear body structure of such two-door type automobile. The word "two-door type" used herein is intended to include such an automobile body structure having a third door on the rear end of the body.

The conventional two-door type automobile body includes on each side a door opening having an upper periphery defined by a roof rail of a closed cross-section extending along each side of a roof panel, a lower periphery defined by a side sill of a closed cross-section extending along each side of a floor panel and a rear periphery defined by a front end portion of a rear body structure. The rear body structure defining the rear periphery of the door opening includes a center pillar extending downwardly from the roof rail to define an upper portion of the door opening and a rear fender panel having a front edge portion defining a lower portion of the door opening. Behind the front edge portion of the rear fender panel, there is disposed an inner panel which has a front edge welded to the front edge of the rear fender panel. The inner panel is of a hat-shaped cross-section having welding flanges at the front and rear edge portions and a generally planar reinforcement panel is provided and welded at the front and rear edges to the welding flanges of the inner panel to form a lower pillar structure of closed cross-section which is connected at the upper end to the center pillar and at the lower end to the side sill. The conventional structure is, however, disadvantageous in that it requires a reinforcement panel which makes the structure complicated and increases the weight. Further, in the conventional structure, there have been restrictions in providing the lower pillar structure with a sufficient widthwise dimension because the structure of closed cross-section can be formed only by the inner panel and the reinforcement panel.

It is therefore an object of the present invention to provide an automobile rear body structure which is simple in construction and can provide satisfactory strength.

Another object of the present invention is to provide an automobile rear body structure for two-door type automobiles which has a simple but strong pillar structure for defining the rear periphery of the door opening.

According to the present invention, the above and other objects can be accomplished by a body structure for a two-door type automobile including roof rail means extending along each side of a roof panel, side sill means extending along each side of a floor panel, center pillar means having an upper end connected with said roof rail means and extending substantially downwardly therefrom, a rear fender panel having a substantially vertically extending front edge portion which is bent transversely inwardly of the body structure to form a stepped configuration complementary to a rear edge configuration of a side door adapted to be mounted on said body structure, an inner panel having a front edge secured to said front edge portion of the rear fender panel and a rear edge also secured to said rear fender panel to form lower pillar means of closed cross-section, said lower pillar means being connected at an upper end with said center pillar means and at a lower end with said side sill.

According to the features of the present invention, it is unnecessary to provide a reinforcement panel to form a lower pillar structure of a closed cross-section along the rear periphery of the door opening. It should further be noted that, since the rear fender is used to form such lower pillar structure, it is possible to increase the width of the closed cross-section to provide a rigid structure. According to one aspect of the present invention, the center pillar may be constituted by an outer and inner pillar panels and the inner pillar panel may form a part of the inner panel. The side sill may include panel members such as a side sill outer and a side sill inner, and the side sill outer may be formed with an upward extension to which the inner panel may be connected.

The above and other objects and features of the present invention will become apparent from the following descriptions of preferred embodiments taking reference to the accompanying drawings, in which:

FIG. 1a is an enlarged fragmentary view showing a detail of the point of interconnection of the center pillar and the rear fender panel.

FIG. 2 is a fragmentary perspective view of the structure shown in FIG. 1 as viewed from the inside;

FIG. 3 is a fragmentary perspective view of the structure shown in FIG. 1 particularly showing the lower portion of the center pillar;

FIG. 4 is a fragmentary perspective view similar to FIG. 2 but showing another embodiment;

FIG. 5 is a view similar to FIG. 3 but showing the embodiment of FIG. 4;

Figure 1:
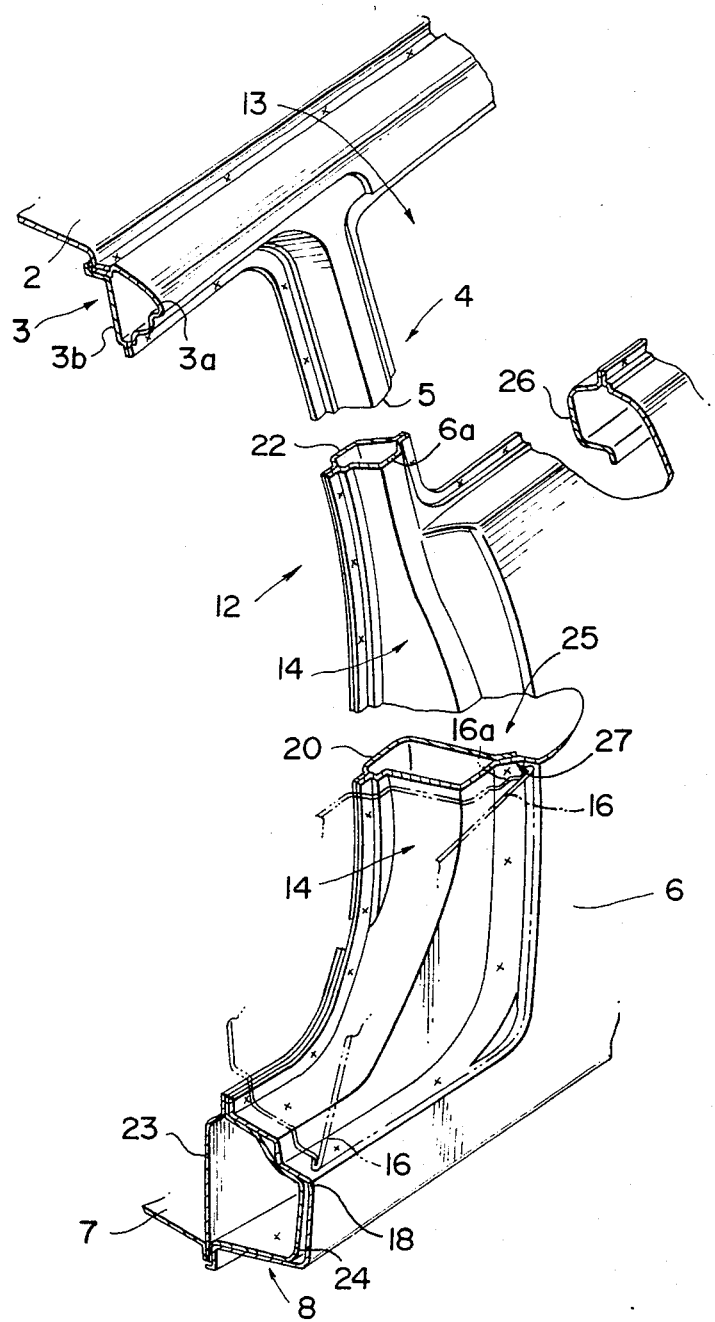
FIG. 1 is a partially broken away fragmentary perspective view of a rear side structure in accordance with one embodiment of the present invention.

Referring now to the drawings, particularly to FIG. 1, it will be noted that the automobile body shown therein includes a roof panel 2 and a roof rail 3 extending along a side edge of the roof panel 2. The roof rail 3 is of a closed cross-section and formed by a roof rail outer 3a which is integral with the side edge of the roof panel 2 and a roof rail inner 3b welded to the roof rail outer 3a. The body further includes a center pillar 4 connected at the upper end with the roof rail 3 in a conventional manner. The center pillar 4 extends downwardly from the roof rail 3 and is constituted by a center pillar outer 5 and center pillar inner 22 which are welded together at front and rear edges to form a closed cross-section.

Beneath the center pillar 4, there is a rear fender panel 6 which is formed at front edge portion with a stepped configuration 14. As shown in FIG. 1, the front edge portion of the rear fender panel 6 extends substantially vertically and the stepped configuration 14 is defined by a transversely inwardly bent portion at the front edge portion of the rear fender panel 6. The inwardly bent portion of stepped configuration 14 includes a front edge portion that extends forwardly thereof and terminates in a forwardly extending flange portion. The body further includes a floor panel 7 and a side sill 8 extending along a side edge portion of the floor panel 7. Rear fender panel 6 defines an outer wall of the automobile body and extends generally parallel to side sill 8. The roof rail 3, the center pillar 4, the stepped configuration 14 of the rear fender panel 6 and the side sill 8 define a rear part of a side door opening 12. Thus, the stepped configuration 14 at the front edge portion of the rear fender panel 6 is so formed that it is complementary to the rear edge configuration of a side door 16 shown by phantom lines in FIG. 1. The roof rail 3, the center pillar 4 and the upper edge portion of the rear fender panel 6 define a rear quarter window opening 13.

As shown in FIGS. 1 and 2, the side sill 8 comprises a side sill inner 23 and a side sill outer 24. The side sill outer 24 has a sidewardly bulged cross-sectional configuration and is welded at the upper and lower edge portions to the side sill inner 23 to form a closed cross-section. The side sill 8 is also welded at its lower portion to the side edge of the floor panel 7. The rear fender panel 6 has a lower forward extension 18 which is arranged to cover the bulged portion of the side sill outer 24 and welded thereto to reinforce the side sill 8. As clearly shown in FIG. 3, an inner panel 20 of substantially L-shaped cross-sectional configuration, and having a front edge secured to the flange portion of the front edge portion, is disposed at the backside of the rear fender 6. The inner panel 20 extends along the front edge portion of the rear fender 6 and has a generally channel or L shaped cross-sectional configuration having a first leg and a second leg substantially perpendicular to each other. The inner panel 20 is welded at the front and rear edges to the front edge portion of the rear fender panel 6 to form a lower pillar structure 25 of a closed cross-section.

The rear fender panel 6 is formed at the front edge portion with an upward extension 6a which is connected with the center pillar outer 5. The center pillar inner 22 extends downwardly beyond the center pillar outer 5 and is connected at the front and rear edges with the rear fender panel 6. The pillar inner 22 is then connected at the lower end portion with the inner panel 20. Thus, a continuous rigid pillar structure of closed cross-section is formed along the rear periphery of the door opening 12. As shown in FIG. 2, the side sill outer 24 is formed at the upper edge portion with an upward extension 24a which is welded to the lower end of the inner panel 20 and also to the lower front edge of the rear fender panel 6. Thus, a rigid connection is provided between the lower pillar structure 25 and the side sill 8.

Figure 6:
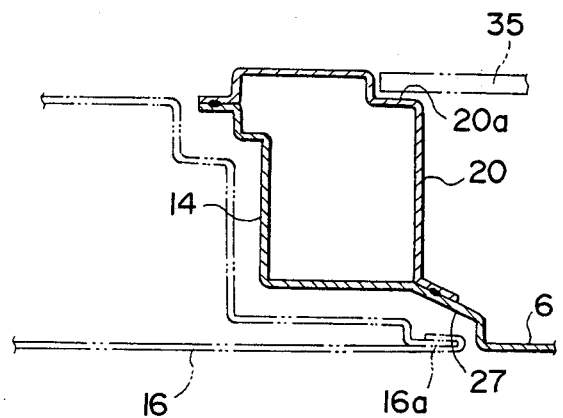
FIG. 6 is a horizontal sectional view of a rear side structure in accordance with a further embodiment of the present invention.

As shown in FIGS. 1 and 3, a rear fender inner 26 is arranged along the upper edge portion of the rear fender panel 6. The rear fender inner 26 is generally of a channel shaped cross-sectional configuration and welded at the upper edge to the upper edge of the rear fender panel 6. Further, the rear fender inner 26 is welded at the front edge to the center pillar inner 22. In the structure described above, the lower pillar structure 25 of a closed cross-section is formed by the front edge portion of the rear fender panel 6 and the inner panel 20 so that it is not required to provide an additional reinforcement panel as in conventional structures and further it is possible to provide the lower pillar structure with an increased width. In the illustrated arrangement, the front edge portion of the rear fender panel 6 is formed with a second stepped portion 27 rearwardly of the stepped configuration 14 and the rear edge of the inner panel 20 is welded to the panel 6 along the second stepped portion 27 as shown in FIG. 6. The rear edge portion of the side door 16 is formed with a rearward extension 16a which is of a configuration complementary to the second stepped portion 27. This arrangement is advantageous in that the welding marks for connecting the inner panel 20 with the rear fender panel 6 can be covered by the side door 16 when it is closed.

FIGS. 4 and 5 show another embodiment of the present invention in which corresponding parts are designated by the same reference characters as in the previous embodiment. In this embodiment, there is provided an inner panel 30 which extends along the front edge portion of the rear fender panel 6. The inner panel 30 is of a generally channel shaped configuration having a bottom wall 32 and a pair of side walls 31 and 33 at the opposite sides of the bottom wall 32. The side wall 33 has a front edge which is welded to the front edge of the rear fender panel 6. The side wall 31 has a front edge formed with a flange 31a which is welded to the back side of the stepped portion 14 of the rear fender panel 6. The side wall 33 of the inner panel 30 is further welded at the lower end portion thereof to the upward extension 24a of the side sill outer 24. Further, the side wall 31 of the inner panel 30 is welded at the lower end portion to the outer side surface of the side sill outer 24.

Referring to FIG. 6, the embodiment shown therein is similar to that shown in FIGS. 1 through 5 so that corresponding parts are designated by the same reference numerals as in FIGS. 1 through 5. In the embodiment shown in FIG. 6, the inner panel is formed at the side opposite to the rear fender panel 6 with a stepped portion 20a where an inner trim panel 35 is attached at the front end.

Figure 7:
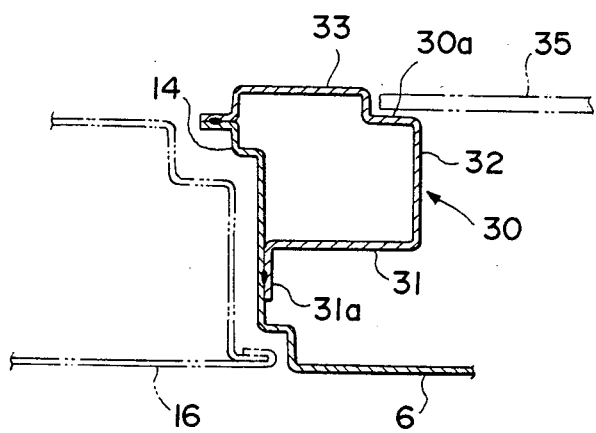
FIG. 7 is a sectional view similar to FIG. 6 but showing a further embodiment.
Figure 8:
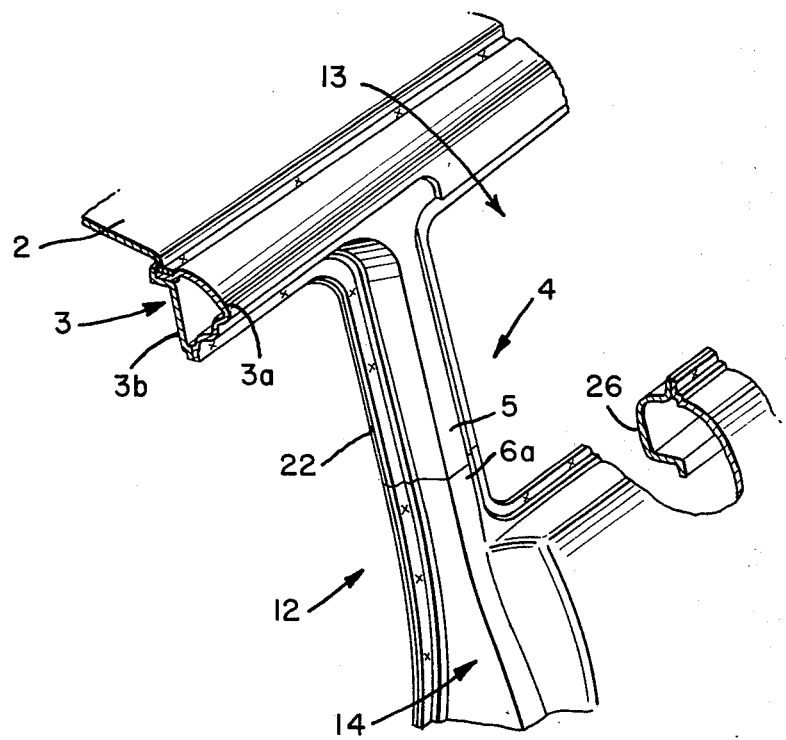
FIG. 8 is a fragmentary perspective view similar to FIG. 1 and showing the center pillar in unbroken form.

FIG. 7 shows a further embodiment which is similar to the embodiment shown in FIGS. 4 and 6. In this embodiment, the inner panel 30 is formed at the corner between the walls 32 and 33 with a stepped portion 30a where the front edge portion of an inner trim panel 35 is attached.

The invention has thus been shown and described with reference to specific embodiments, however, it should be noted that the invention is in no way limited to the details of the illustrated structures but changes and modifications may be made without departing from the scope of the appended claims.

We claim:

1. A body structure for a two-door type automobile including roof rail means extending along each side of a roof panel, side sill means extending along each side of a floor panel, center pillar means comprising a pillar inner and a pillar outer which are connected together to form a structure of a closed cross-section, said center pillar means having an upper end connected with said roof rail means and extending substantially downwardly therefrom, a rear fender panel having a substantially vertically extending front edge portion which is bent transversely inwardly of the body structure to form a stepped configuration complementary to a rear edge configuration of a side door adapted to be mounted on said body structure, an inner panel having a front edge secured to said front edge portion of the rear fender panel and extending rearwardly from said front edge with a space with respect to said rear fender panel and then bent transversely outwardly toward said rear fender panel, said inner panel further having a rear edge also secured to said rear fender panel at a portion which is covered by a rear edge portion of the side door to form a lower pillar means of closed cross-section, said lower pillar means being connected at a lower end with said side sill means, said inner panel of the lower pillar means being connected with the pillar inner of the center pillar means and said rear fender panel being connected with the pillar outer of the center pillar means so that the closed cross-section of the lower pillar means is contiguous with the closed cross-section of the center pillar means.

2. A body structure in accordance with claim 1 in which said side sill means includes a side sill outer and a side sill inner, said side still outer having an upward extension which is connected with a lower end portion of said inner panel, said side sill outer further having an outwardly bulged portion which is connected with a lower edge portion of said rear fender panel.

3. A body structure in accordance with claim 1 in which said rear fender panel has a second stepped portion rearwardly of said stepped configuration, said side door having a rear edge portion formed with a rearward extension complementary to said second stepped portion and, said rear edge of the inner panel is secured to the rear fender panel at the second stepped portion.

4. A body structure in accordance with claim 1 in which said pillar inner extends downwardly beyond a lower end of said pillar outer.

5. A body structure for a two-door type automobile including roof rail means extending along each side of a roof panel, side sill means extending along each side of a floor panel, center pillar means comprising a pillar inner and a pillar outer which are connected together to form a structure of a closed cross-section, said center pillar means having an upper end connected with said roof rail means and extending substantially downwardly therefrom, a rear fender panel having a substantially vertically extending stepped front portion which is bent transversely inwardly of the body structure to form a stepped configuration complementary to a rear edge configuration of a side door adapted to be mounted on said body structure, said front portion of the rear fender having a front edge portion extending further forward from said stepped front portion, said front edge portion bent transversely inwardly and terminating in a forwardly extending flange portion, an inner panel of substantially L-shaped, cross-sectional configuration having a front edge secured to said flange portion of said front edge portion of the rear fender panel and extending rearwardly from said front edge with a space with respect to said rear fender panel and then bent transversely outwardly toward said rear fender panel, said inner panel further having a rear edge also secured to said rear fender panel at said stepped front portion which is covered by a rear edge portion of the side door to form a lower pillar means of closed cross-section, said lower pillar means being connected at a lower end with said side sill means, said inner panel of the lower pillar means being connected with the pillar inner of the center pillar means and said rear fender panel being connected with the pillar outer of the center pillar means so that the closed cross-section of the lower pillar means is contiguous with the closed cross-section of the center pillar means.

6. A body structure for a two-door type automobile comprising:
roof rail means extending along each side of a roof panel;
side sill means extending along each side of a floor panel;
center pillar means comprising a substantially U-shaped pillar inner member and a substantially U-shaped pillar outer member with their interior portions facing each other, each of said U-shaped members including outwardly extending flanges, corresponding flanges of said inner pillar member and of said outer pillar member being in abutting relationship and connected together to form a structure of closed, substantially rectangular cross-section, said center pillar means having an upper end connected with said roof rail means and a lower end extending substantially downwardly therefrom;
a rear fender panel defining an outer wall of said automobile body and extending generally parallel to said side sill means, said rear fender panel including a substantially vertically extending front portion that includes a front wall that is bent transversely inwardly of the body structure and includes a stepped configuration complementary to a rear edge configuration of a side door adapted to be mounted on said body structure, said front portion of the rear fender having a front edge portion spaced inwardly of the outer wall of said body, said front edge portion extending further forward from said stepped front portion, defining a forwardly extending flange;
an inner panel of substantially L-shaped cross-sectional configuration having a first leg and a second leg substantially perpendicular to each other, the outermost portion of said second leg including a forwardly extending flange secured to said flange of said front edge portion of the rear fender panel, said second leg extending rearwardly from said front edge portion and defining a space with said rear fender panel, said first leg extending outwardly toward said rear fender panel and terminating in a rear edge portion secured to said rear fender panel at a point spaced rearwardly of said flange at said front portion at a point which is covered by a rear edge portion of the side door, the front portion of said rear fender panel and said inner panel defining a lower pillar means of closed, substantially rectangular cross-section, said lower pillar means being connected at a lower end with said side sill means; and
an upper end of said inner panel of the lower pillar means being connected with a lower end of the pillar inner member of the center pillar means and an upper end of said rear fender panel being connected with a lower end of the pillar outer member of the center pillar means so that the closed cross-section of the lower pillar means and the closed cross-section of the center pillar means define a continuous center pillar of said automobile body.

* * * * *